United States Patent

[11] 3,590,763

| [72] | Inventor | Rowland Delville Hunt<br>Portsmouth, England |
|---|---|---|
| [21] | Appl. No. | 769,075 |
| [22] | Filed | Oct. 21, 1968 |
| [45] | Patented | July 6, 1971 |
| [73] | Assignee | Vosper Limited |
| [32] | Priority | Nov. 8, 1967 |
| [33] | | Great Britain |
| [31] | | 50840 |

[54] GAS-CUSHION VEHICLES
5 Claims, 1 Drawing Fig.

| [52] | U.S. Cl. | 114/67 |
|---|---|---|
| [51] | Int. Cl. | B63b 1/34 |
| [50] | Field of Search | 114/67.1; 180/127 |

[56] References Cited
UNITED STATES PATENTS

| 1,916,121 | 6/1933 | Dombrady | 115/37 |
| 2,341,866 | 2/1944 | Higgins | 114/60 |
| 2,995,104 | 8/1961 | Mills | 115/37 X |
| 3,294,188 | 12/1966 | Hardy | 180/127 |
| 3,399,644 | 9/1968 | Hunt | 114/67 |

*Primary Examiner*—Andrew H. Farrell
*Attorney*—Norris & Bateman

ABSTRACT: A gas-cushion vehicle having a hull provided with supports adjacent the bow and skegs adjacent the stern upon which the vehicle can rest stably on a solid surface when the supply of gas to the cushion space is cutoff.

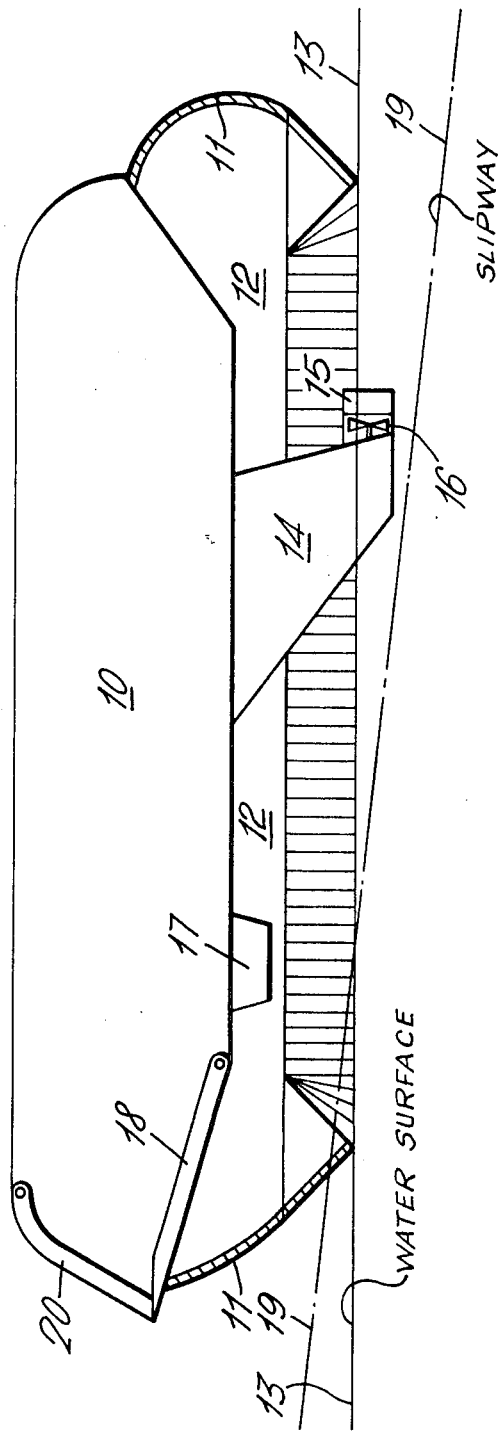

GAS-CUSHION VEHICLES

The invention relates to gas-cushion vehicles, and more particularly to gas-cushion vehicles designed as car ferries.

The object of the invention is to facilitate loading and unloading at one end of the vehicle.

According to the invention, a vehicle which during part of its operation is wholly or partially supported by at least one cushion of pressurized gas has three or more supports on which it can rest stably on a solid surface.

A preferred embodiment of the invention will now be described, by way of example only, with reference to the accompanying drawing which is a partially sectioned side elevation view of a gas-cushion car ferry vehicle.

Referring now to the drawing, a gas-cushion vehicle for use on water has a hull 10 provided with a flexible skirt 11 defining a space 12 which can be supplied with gas under pressure by means (not shown) so as to support the hull 10 above a water surface 13 on a cushion of gas in known manner. Two laterally spaced skegs or keellike members 14 projecting below the water surface 13 and each carrying at its lower end a rudder 15 and a screw 16 driven by propulsion means (not shown) are located aft within the space 12, and two laterally spaced supports 17 are located forward within said space, the supports 17 projecting substantially less than the skegs 14 below the hull 10. A hinged ramp 18 and a hinged door 20 are provided at the front of the hull 10.

In operation, the vehicle is maneuvered into position above a suitable sloping beach of concrete slipway shown in broken lines at 19, and the supply of gas under pressure to the space 12 is cutoff. The vehicle sinks to a position in which the skegs 14 and the supports 17 rest on the slipway, which is preferably constructed with such a slope that the vehicle then has a slightly nose-down attitude to enable unloading to be carried out if desired by allowing each car or the like simply to freewheel to the front of the vehicle. That part of the skirt 11 at the front of the vehicle is temporarily deformed as the vehicle sinks on to the slipway. The door 20 is then raised and the ramp 18 is lowered on to that part of the slipway above water level. After unloading and loading have taken place, the ramp 18 is raised, the door 20 is lowered, the supply of gas under pressure to the space 12 is resumed, and the vehicle is maneuvered away from the slipway.

In a modification, the screw 16 carried by each skeg 14 is replaced by a water jet device which provides propulsive power. The water jet device may be pivotally mounted in order to provide steering control without the use of the rudder 15.

What I claim is:

1. A vehicle which during part of its operation is wholly or partially supported upon the surface of a body of water by at least one cushion of pressurized gas comprising a hull having a depending skirt of flexible material defining with the hull a space above the water adapted to be supplied with gas under pressure, spaced support means depending from said hull within said space for supporting the vehicle on a solid surface and comprising two laterally spaced skegs each projecting below said surface whether or not the vehicle is supported by said cushion and at least one support member spaced longitudinally from the skegs, said skegs being located in the aft portion of said space and said one support member being located in the forward portion of said space, said one support member projecting substantially less than the skegs below said hull and disposed above said surface when the vehicle is supported by said cushion, and propulsion means carried from the rear of each skeg.

2. A vehicle according to claim 1 comprising means at the forward end of the vehicle for loading and unloading the vehicle.

3. A vehicle according to claim 1, wherein said propulsion means comprises a water screw.

4. A vehicle according to claim 1, wherein the propulsion means comprises a water jet device.

5. A vehicle which during part of its operation is wholly or partially supported upon the surface of a body of water by at least one cushion of pressurized gas comprising a hull having a depending skirt of flexible material defining with the hull a space above the water adapted to be supplied with gas under pressure, spaced support means depending from said hull within said space for supporting the vehicle on a solid surface and comprising two laterally spaced skegs each projecting below said surface whether or not the vehicle is supported by said cushion and at least one support member spaced longitudinally from the skegs, said skegs being located adjacent one end of said space and said one support member being located adjacent the other end of said space, said one support member projecting substantially less than the skegs below said hull and disposed above said surface when the vehicle is supported by said cushion, propulsion means carried by each skeg, and means at the other end of the vehicle for loading and unloading the vehicle.